US006412335B1

(12) United States Patent
Detweiler et al.

(10) Patent No.: US 6,412,335 B1
(45) Date of Patent: Jul. 2, 2002

(54) LOW CURRENT SOLENOID VALVE

(75) Inventors: Charles A. Detweiler, Durand; Daniel L. DeLand, Davison; Gerrit V. Beneker, Algonac; David R. Sosnowski, Lake Orion, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/708,941

(22) Filed: Nov. 8, 2000

(51) Int. Cl.[7] .................................................. G01M 3/08

(52) U.S. Cl. ...................... 73/40.5 R; 73/118.1; 73/49.7

(58) Field of Search ............................ 73/40.5 R, 49.2, 73/49.7, 118.1; 123/518, 519, 520; 251/129.15, 129.19

(56) References Cited

U.S. PATENT DOCUMENTS 5,128,826 A * 7/1992 Yoneshige .................. 361/165
5,204,044 A * 4/1993 Yoneshige ............. 264/272.15
5,429,099 A * 7/1995 DeLand ...................... 123/520
5,437,257 A * 8/1995 Giacomazzi et al. ........ 123/520
5,467,641 A * 11/1995 Williams et al. ............. 73/49.7
5,535,725 A * 7/1996 Baker et al. ................ 123/520
5,775,670 A * 7/1998 Osterbrink ............. 251/129.15
5,911,209 A * 6/1999 Kouda et al. ............... 123/520
6,073,487 A * 6/2000 Dawson ...................... 73/118.1
6,220,229 B1 * 4/2001 Kawamura et al. ......... 123/520
6,279,548 B1 * 8/2001 Reddy ........................ 123/520

* cited by examiner

*Primary Examiner*—Hezron Williams
*Assistant Examiner*—Charles D. Garber
(74) *Attorney, Agent, or Firm*—Roger A. Johnston

(57) ABSTRACT

A solenoid operated valve is connected in series with a resistor and a PTC thermistor. Upon coil energization, the armature moves to close the valve member against a valve seat and further armature movement to close an air gap with a pole piece is absorbed by a spring between the armature and valve member. Upon closure of the air gap, the magnetic reluctance between the armature and pole piece is decreased such that significantly less current is required in the coil to hold the valve closed. Upon heating of the thermistor, the resistance is increased sufficiently to reduce the current to the hold-close level and less power is required thereafter to maintain the valve closed. The valve is applied to on-board vehicle diagnostic procedures performed after engine shut-down where current must be minimized to prevent battery drain to a level preventing re-start.

3 Claims, 5 Drawing Sheets

LOW CURRENT SOLENOID VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to solenoid operated valves and particularly those attended for use on board a motor vehicle and operating from a relatively low voltage power supply.

In certain motor vehicle emissions control systems, it is necessary to energize an electrically operated valve for closure when the engine is not running in order to perform a diagnostic procedure on the vehicle fuel system. Where the valve must be maintained in the energized state and closed position for a prolonged period of time, on the order of thirty minutes or more, severe drain on the vehicle battery and can result in a battery which has insufficient charge to restart the vehicle engine.

Accordingly, it has been desired to provide a solenoid operated valve for on-board motor vehicle usage which can be energized and maintained in the energized condition for holding the valve closed for a length of time without unduly draining charge from the vehicle battery when the engine is not operating.

Presently available solenoid operated valves draw a prohibitive amount of current for such usage and thus, it has long been desired to provide a solenoid operated valve which can be maintained in the energized state at a significantly reduced current level from the initial energization current.

Heretofore, this problem has been addressed by the use of a relatively complex electronic circuit which provided a high current for a time period sufficient to cause the armature to move the desired amount, followed by a reduced current to maintain the solenoid in the energized state. The present invention solves the above-described problem with a simplified and less costly circuit.

BRIEF SUMMARY OF THE INVENTION

The present invention provides a solenoid operated valve capable of energization from an on-board vehicle low voltage power supply and which, after initial energization, magnetically latches to require a substantially reduced current level to maintain the energized state and closure of the valve. The present invention thus minimizes the current draw from the vehicle power supply for diagnostic purposes when the engine is not running and recharging the battery.

The valve of the present invention has a positive temperature coefficient (PTC) resistor or thermistor connected electrically in series with the valve coil; and, upon initial energization, the thermistor has a relatively low resistance permitting substantial current flow to the coil for creating a sufficient magnetomotive force to effect valve closing. Upon heating of the thermistor from the current flow therethrough, the thermistor resistance increases to a significantly higher level resulting in reduced current flow to the solenoid coil. The initial closing of the valve effects closing of the working air gap between the armature and a pole piece in the valve; and the resultant decrease in magnetic reluctance upon closing of the air gap enables sufficient force to hold the valve closed at the reduced current level.

The present invention thus provides a solenoid operated valve suitable for use on board a vehicle for emissions diagnostic test procedures performed after the vehicle engine is shut off which minimizes the current drain on the vehicle battery to prevent battery discharge to a level which would otherwise disable restarting of the vehicle engine.

DETAILED DESCRIPTION OF THE INVENTION

Figure 1:
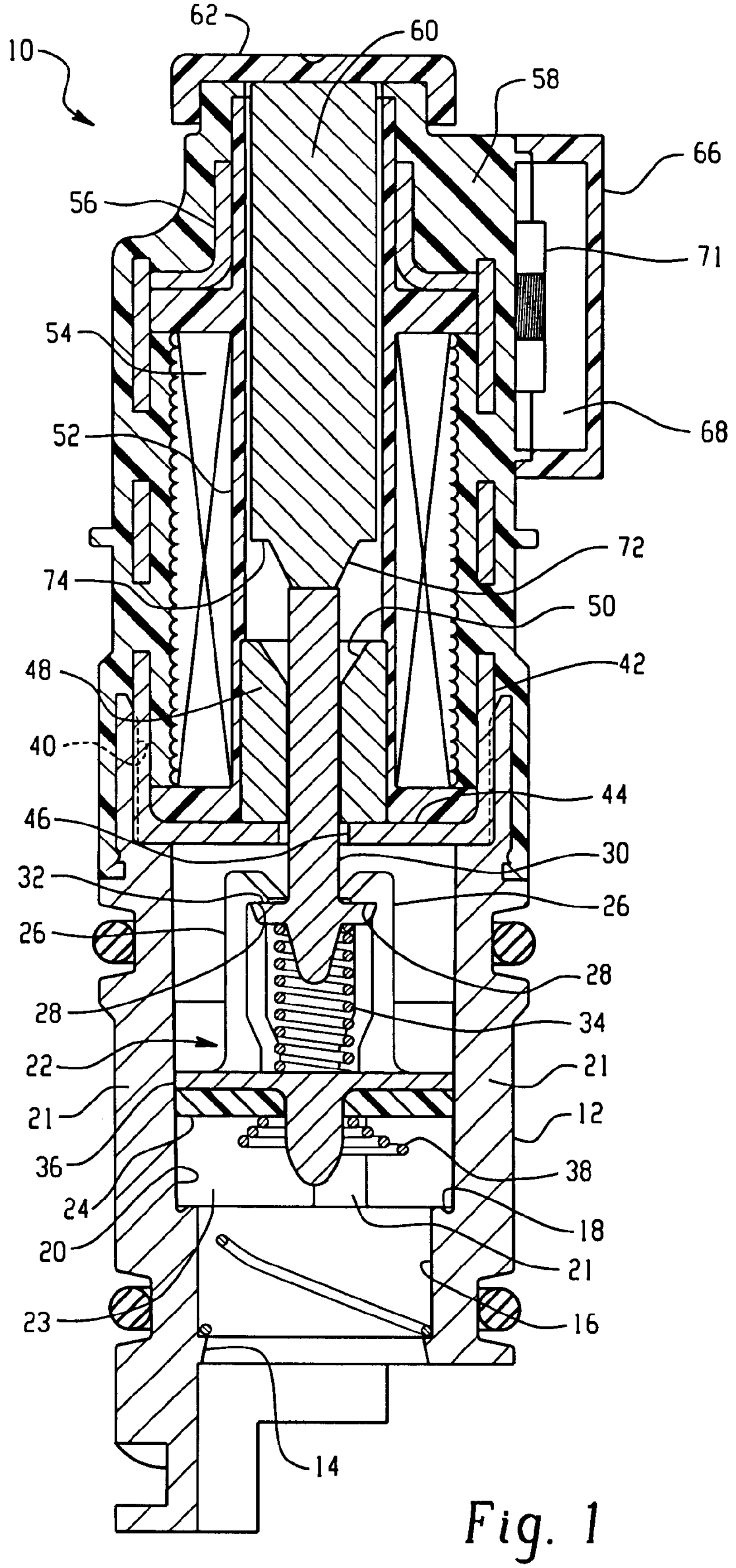
FIG. 1 is a detailed view of the valve assembly generally in the de-energized state.

Referring to FIG. 1, the valve assembly of the present invention is indicated generally at 10 in the de-energized or open condition and has a valve body 12 with an inlet 14 communicating with a valving chamber formed by a bore 16 formed in the valve body. Bore 16 communicates with an annular valve seat 18. A valve seat 18 is formed by an enlarged area 20 in the valve body formed by posts or axially extending ribs 21 which are circumferentially spaced. The openings 23 between posts or ribs 21 form the outlet of the valve body. Ribs 21 and area 20 have slidably received therein a valve member indicated generally at 22 which has a resilient seat washer 24 provided thereon for making sealing contact with the valve seat 18. The valve member 22 includes thereon a plurality of stanchions 26 extending upwardly therefrom and disposed in arcuately spaced arrangement with each of the stanchions having an inwardly extending flanged portion 28 provided thereon.

An operating rod member 30 is slidably received between the flanges 28; and, rod 30 has an outwardly extending annular flange 32 provided thereon which is of sufficient diameter to engage the undersurface of flanges 28 on stanchions 26. Rod 30 extends upwardly and outwardly of the body area 20.

The valve 22 includes a spring 34 which has its upper end registered against the undersurface of flange 32; and, the lower end is registered against the upper surface of a flange 36 of the valve member 22, which flange 36 closely interfits to post 21 of area 20 in sliding engagement. The flange 32 of the operating rod is biased upwardly against the undersurface of flanges 28 on stanchions 26 by the upper end of spring 34.

The valve member 22 is biased upwardly to move the seat washer 24 away from valve seat 18 by spring 38 received in the valving bore 16.

The upper end of body 12 has received therein and engaged preferably by press fitted arrangement 40 with the lower end of a cylindrical pole frame or flux collector 42 formed of magnetically permeable material and which has an inwardly extending annular flange 44 formed on the lower end thereof with a clearance hole 46 formed therein and through which extends the upper end of operating rod 30. The flange 44 has registered against the upper surface thereof an annular pole piece 48 which has operating rod 30 extending upwardly therethrough. The upper end of pole piece 48 has the inner periphery thereof chamfered at 50 to accommodate an armature as will hereinafter be described.

A bobbin 52 is received over pole piece 48 and has wound thereabout a energizable electrical coil 54 which has the leads thereof (not shown in FIG. 1) extending outwardly therefrom and adapted for external connection thereto. An upper flux collector of magnetically permeable material for closing the magnetic loop about the coil is provided in the form of an annular outwardly flanged member 56 received over the bobbin 52; and, the coil, bobbin and flux collectors 42, 56 are encapsulated by suitable insulating material such as, for example, thermoplastic resin as denoted by reference numeral 58.

An armature 60 of magnetically permeable material is disposed slidably within the bobbin and is retained therein by a closure or cap member 62 received over the upper end of the encapsulated material surrounding the bobbin. Thus, in the open condition shown in FIG. 1, fluid flow is provided between outlet passage 23 and inlet 14.

Figure 4:
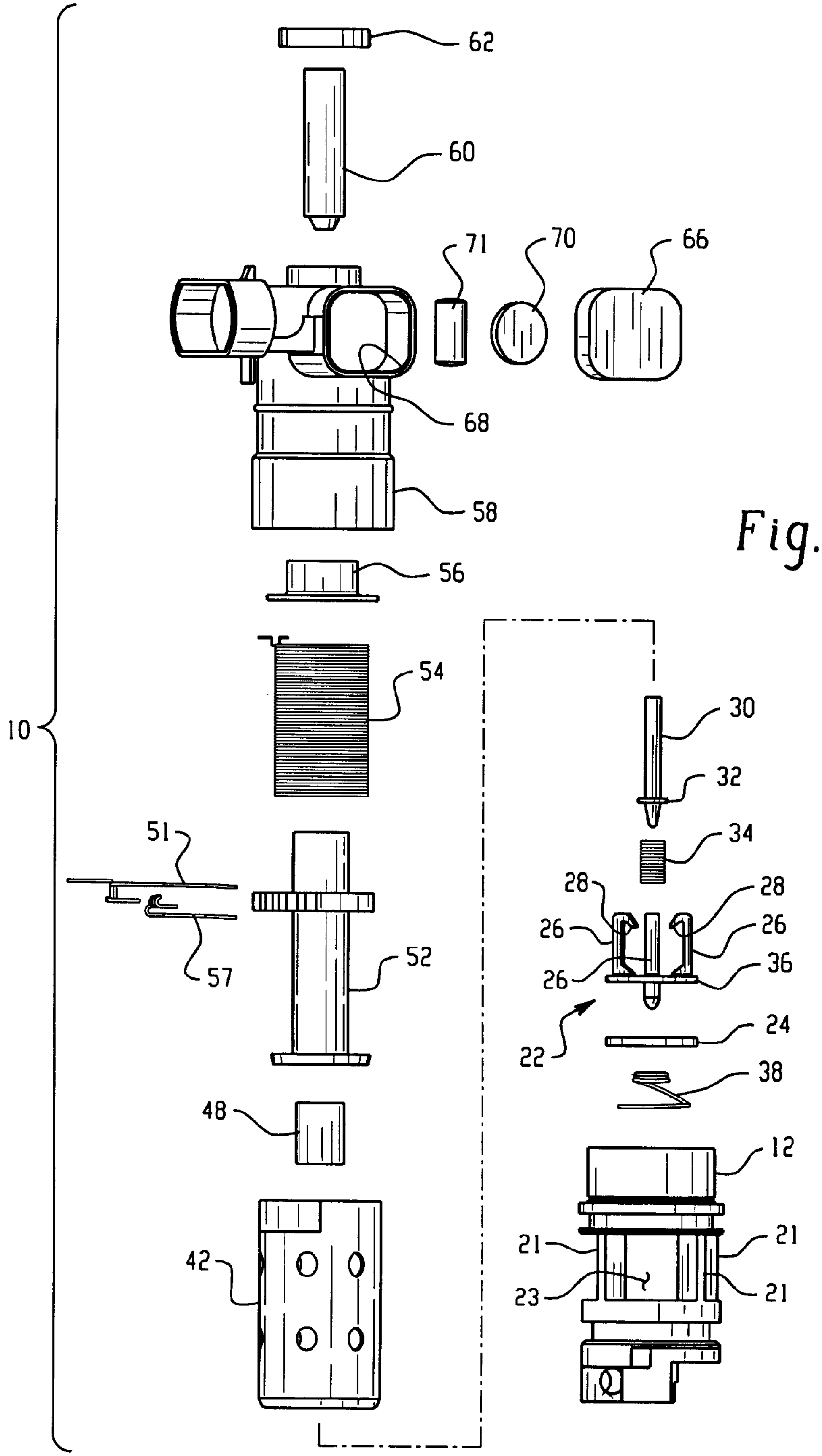
FIG. 4 is an exploded view of the valve of the present invention.

A side chamber is formed on the encapsulating material by a cover 66 received thereover and attached thereto as, for example, by non-metallic weldment to form a chamber 68 therein into which is received a resistor 71 and a thermistor 70 as shown in FIG. 4.

Armature 60 has on the lower end thereof a conically tapered projection 72 which forms an annular shoulder 74 on the lower end of armature 60. In the de-energized condition of the valve shown in FIG. 1, the upper end of the armature 60 contacts the undersurface of cap 62; and, shoulder 74 is spaced from the upper surface of the pole piece 48.

Figure 2:
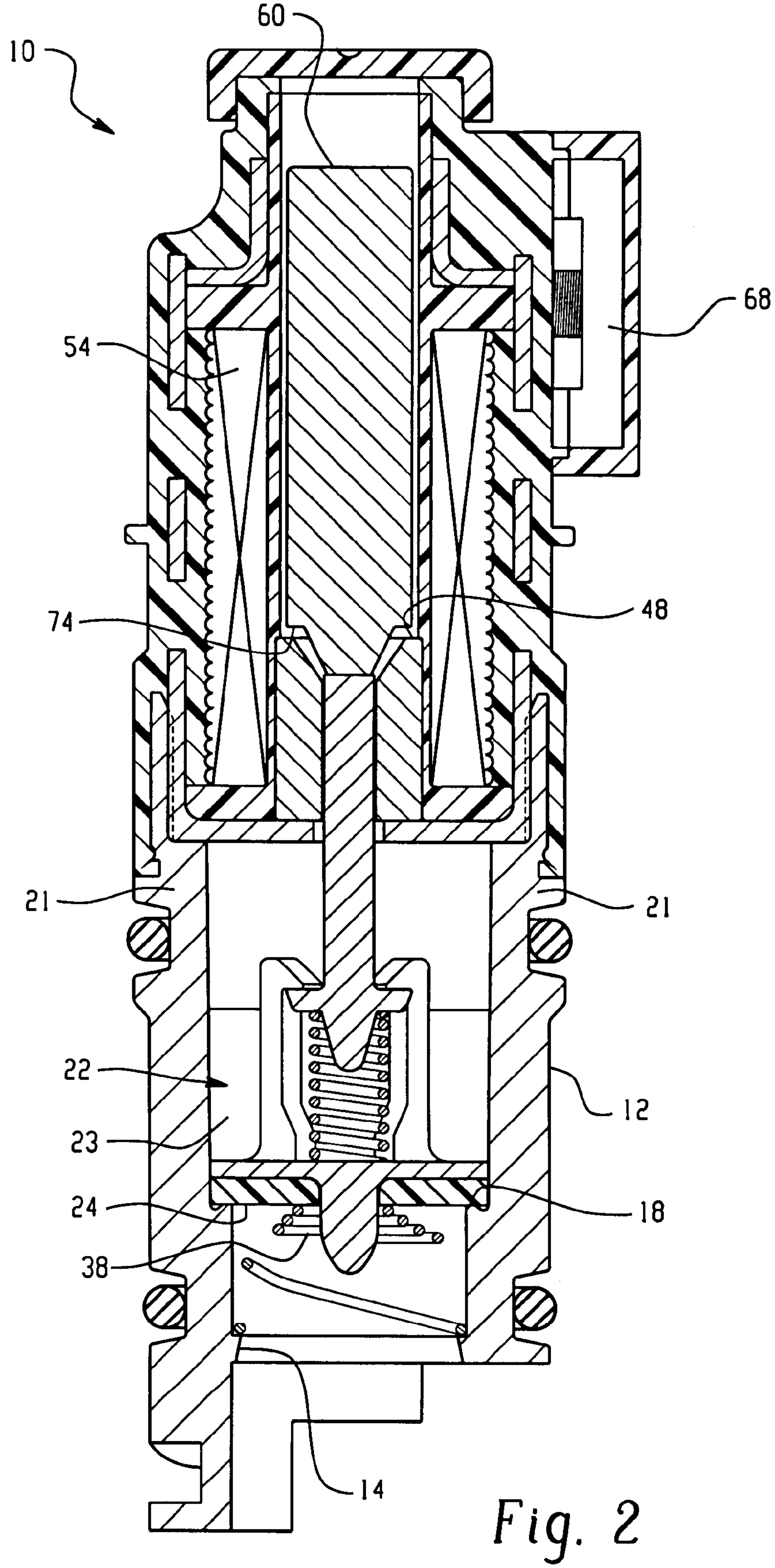
FIG. 2 is a view showing the armature in the position closing the air gap upon continued energization.

Referring to FIG. 2, armature 60 has been moved downwardly by energization of coil 54 sufficiently to cause valve 22 to move downwardly overcoming bias of spring 38 and to seat the washer 24 against the valve seat 18 to block flow from inlet passage 14 to outlet passage 23. It will be observed that the shoulder 74 on the lower end of the armature is spaced from the upper surface 76 of the pole piece 48 in the condition shown in FIG. 2.

Figure 3:
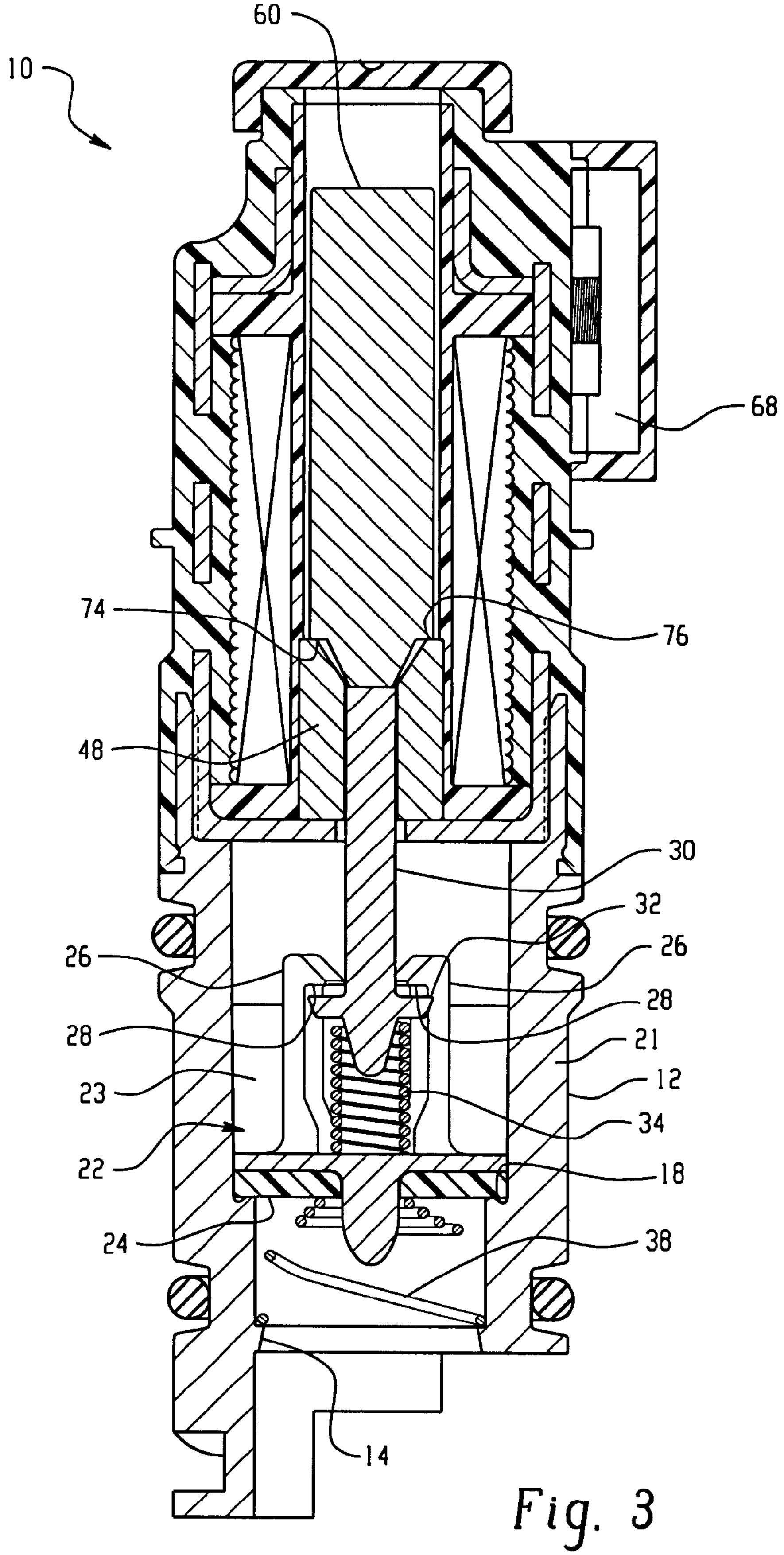
FIG. 3 is a view showing the valve assembly in the fully energized condition.

Referring to FIG. 3, the valve assembly 10 is shown in the fully energized condition with armature 60 moved downwardly to a position causing the shoulder 74 to contact and register against the upper surface 76 of the pole piece 48. In the position shown in FIG. 3, the armature has moved operating rod 30 downwardly to cause flange 32 to be spaced from the flanges 28 on stanchions 26, which movement is absorbed by compression of spring 34. The valve 22 is thus able to absorb over-travel after closure of washer 24 on seat 18 by movement of operating rod 30 relative to the flanges 26. The closure of the shoulder 74 on the upper surface 76 of pole piece 48 creates a substantial reduction in the magnetic reluctance of the air gap between the armature and the pole piece 48, thereby permitting the armature to be held in the downward position and the valve to remain closed with a substantially reduced current.

Referring to FIG. 4, coil 54 has winding end-leads 53, 55 which are connected to connector terminals 51, 57 provided on one flange of bobbin 52.

Figure 5:
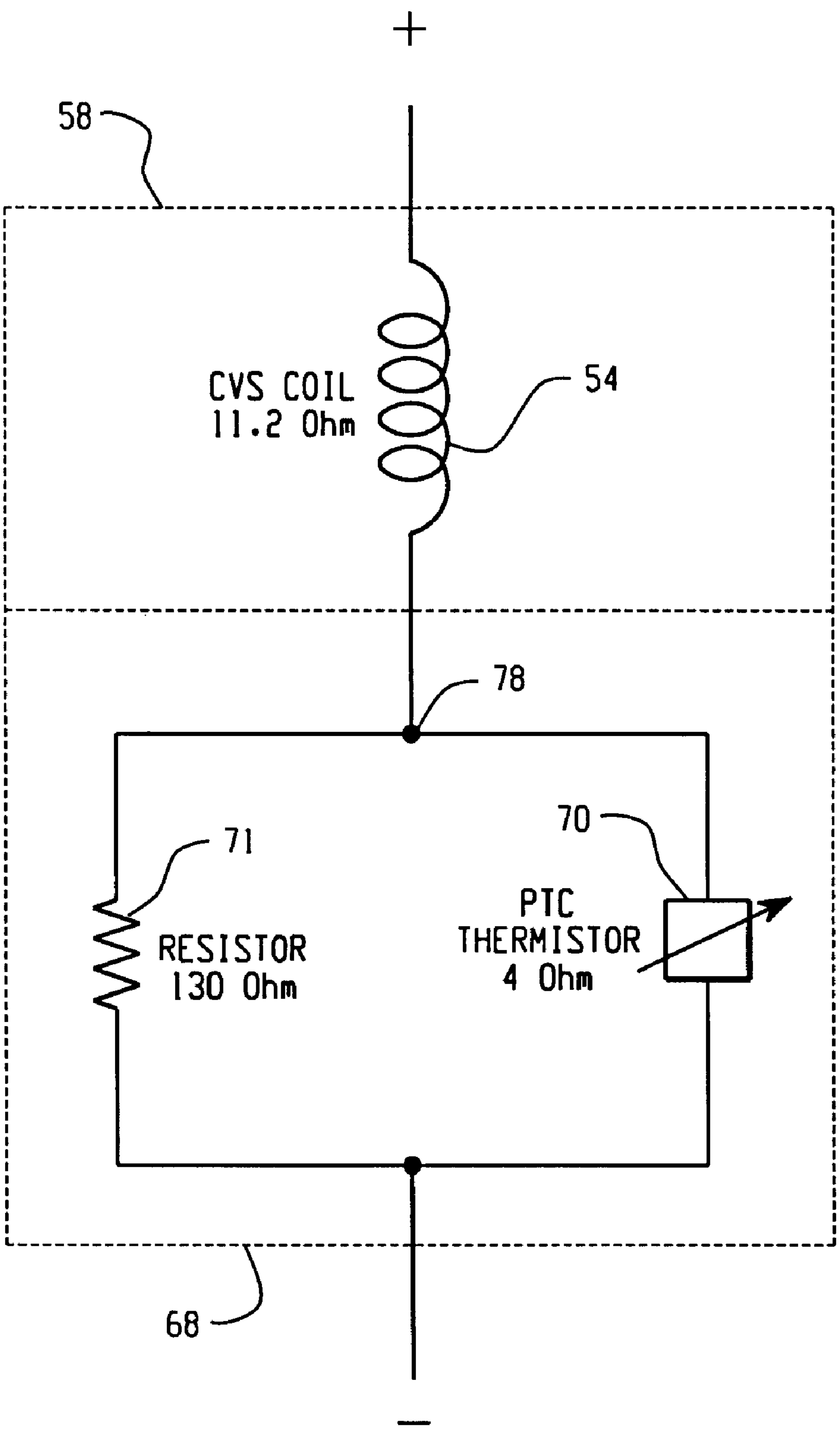
FIG. 5 is a schematic of the circuit for the valve of the present invention.

Referring to FIG. 5, the schematic of the electrical connection of the valve 10 is indicated wherein the coil 54 is connected electrically in series with resistor 71 and thermistor 70 which are connected through junction 78 to one end lead of coil 54. In the present practice of the invention the coil has a resistance of about 11.2 ohms, the resistor 71 has a resistance of about 130 ohms and the PTC thermistor has an initial resistance of about 4 ohms. The arrangement of FIG. 5 thus permits the initial current flow through the thermistor in its low resistant state to provide enough magnetomotive force for the armature to close the valve and magnetically latch the armature against pole piece 48. Upon heating of the thermistor and increase in its resistance, the result is a significant decrease in current flow; however, the reduced current is able to maintain the valve in the closed position due to the minimal air gap between the armature and pole piece 48.

Although the invention has hereinabove been described with respect to the illustrated embodiments, it will be understood that the invention is capable of modification and variation and is limited only by the following claims.

What is claimed is:

1. A diagnostic system for a motor vehicle fuel vapor management system comprising:

(a) a fuel vapor storage canister connected to receive fuel vapor through a conduit from the vehicle fuel tank and atmospheric air;

(b) means for controlling flow of vapor from said canister to the air inlet of the vehicle motor;

(c) an electrically operated valve disposed for controlling venting of atmospheric air to said canister; and, (d) a PTC resistor electrically in circuit with said electrically operated valve, said resistor operative to reduce the current flow in said valve after a predetermined time interval, wherein said valve has a solenoid operator with an armature connected to a valve element moveable between an open and closed position wherein said armature continues movement with respect to said valve element for closing a working air gap with a pole piece when said valve element is in the closed position.

2. A diagnostic system for a motor vehicle fuel vapor management system comprising:

(a) a fuel vapor storage canister connected to receive fuel vapor through a conduit from the vehicle fuel tank and atmospheric air;

(b) means for controlling flow of vapor from said canister to the air inlet of the vehicle motor;

(c) an electrically operated valve disposed for controlling venting of atmospheric air to said canister; and, (d) a PTC resistor electrically in circuit with said electrically operated valve, said resistor operative to reduce the current flow in said valve after a predetermined time interval, wherein said electrically operated valve includes a solenoid having a moveable armature defining a working air gap with a stationary pole piece; and, said valve includes means operable to permit movement of said armature after valve closure to permit closing of said working air gap for maximizing flux concentration and thereby holding said valve closed with reduced current.

3. A method of diagnosing leakage in a motor vehicle fuel vapor management system of the type having a storage canister receiving vapor from the fuel tank and means for purging the canister through an atmospheric air inlet in the canister to the engine inlet upon engine start up comprising:

(a) disposing an electrically operated valve in the canister atmospheric air inlet and energizing and closing said valve upon engine shut down;

(b) maintaining said valve energized and detecting the pressure in said canister after a specified time interval following engine shut down;

(c) disposing a PTC resistor in circuit with said valve and decreasing the current flow in said valve to a preselected threshold during said maintaining and said step of energizing and closing said valve includes energizing a coil and moving an armature for closing said valve, wherein said step of moving an armature includes continuing armature movement after closing said valve and closing a working air gap for maximizing flux and operating said coil at substantially reduced current.

* * * * *